United States Patent Office 3,336,915
Patented Aug. 22, 1967

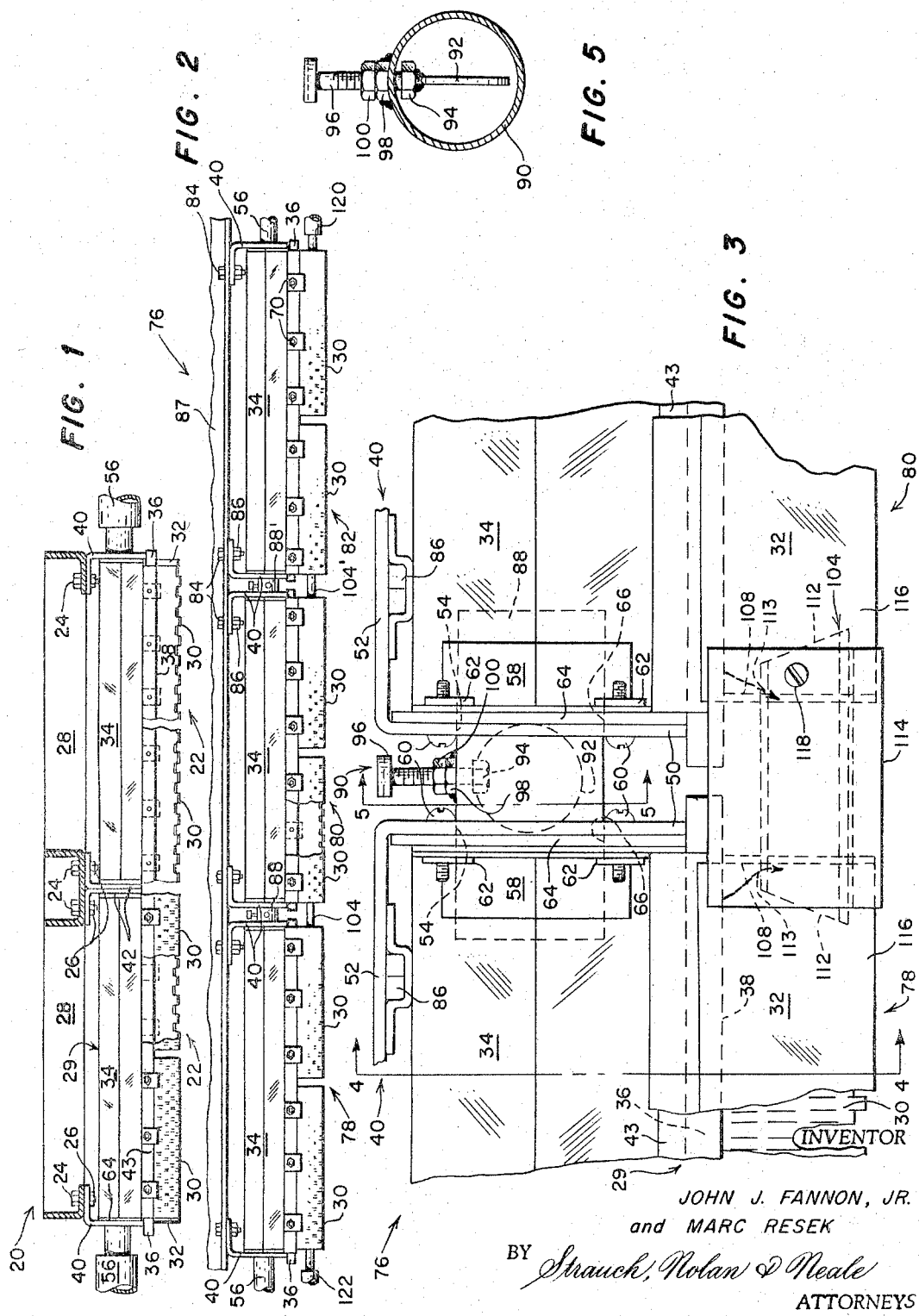

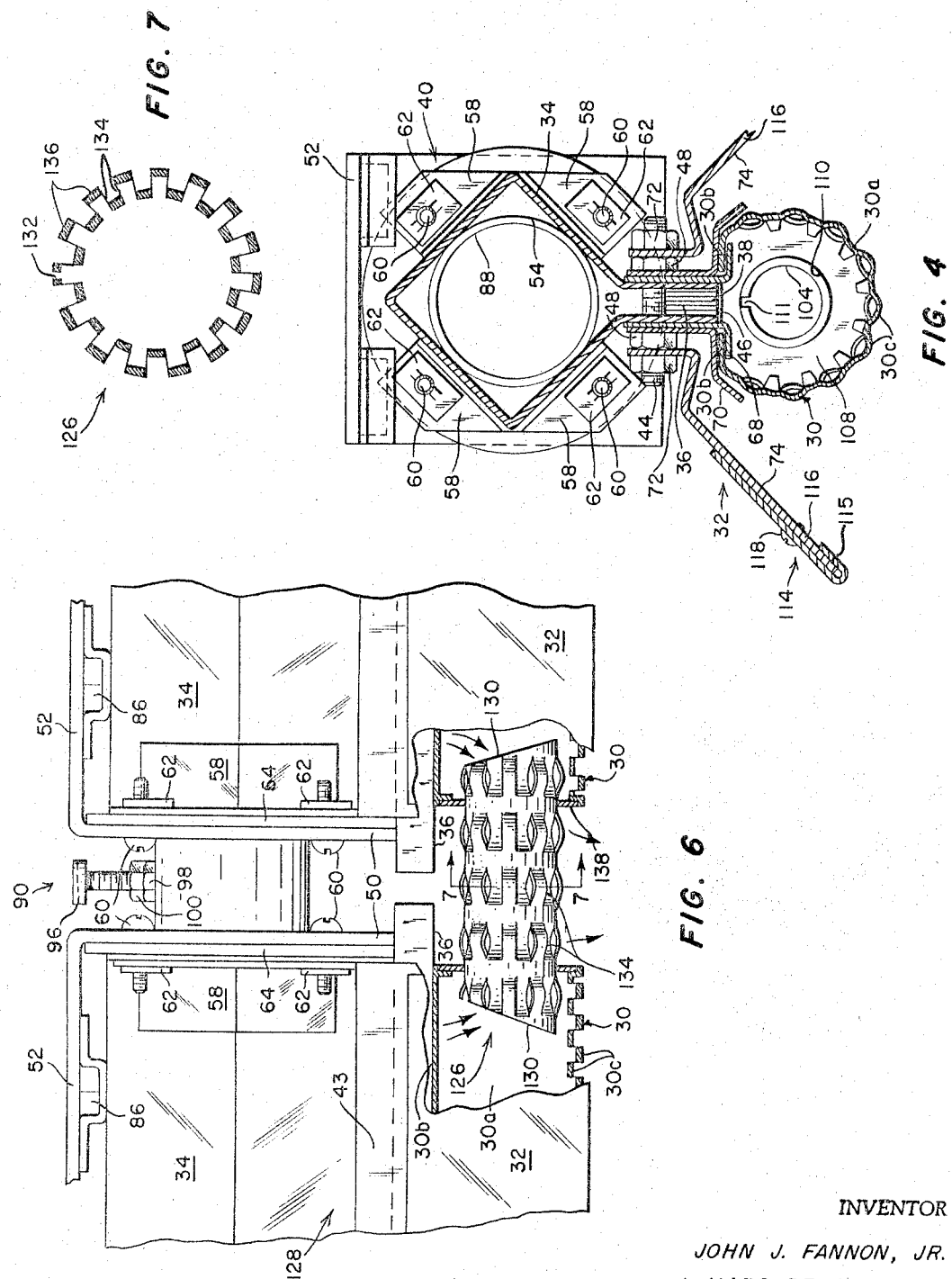

3,336,915
END-TO-END CONNECTING STRUCTURE FOR INFRA-RED GAS BURNERS
John J. Fannon, Jr., Grosse Pointe Park, Mich., and Marc Resek, Shaker Heights, Ohio, assignors, by mesne assignments, to Fostoria-Fannon, Inc., a corporation of Ohio
Filed Oct. 2, 1964, Ser. No. 401,135
10 Claims. (Cl. 126—92)

This invention relates to heating apparatus and, more specifically, to novel multiple unit line burner installations and to novel multiple unit infrared generator installations employing line burners.

Copending applications Nos. 395,839 filed Sept. 11, 1964, by John J. Fannon, Jr., for Apparatus, and 397,775 filed Sept. 21, 1964, by John J. Fannon, Jr., et al. for Apparatus, disclose line burners in which a combustible fuel-air mixture flows from a plenum or distribution tube through an orifice grid and burns on the outer surface of the grid. The heat liberated by the combustion of the fuel-air mixture may be transferred by direct radiation or contact or by circulation of the burning gases, depending on the application of the burner and/or the type of heating device in which it is incorporated. Or these burners may be readily provided with an apertured radiant grid which is heated to incandescence by the burning gases and emits infrared radiation which is directed onto the articles or into the area to be heated.

These line burners and infrared generators (line burners and infrared generators of the type to which this application relates will hereafter be collectively referred to as "heating units"), have a number of advantages over those of the prior art including higher operating temperatures, greater efficiency, higher heat output per unit of space occupied, and longer useful life. In addition, they are applicable to a wider variety of processes, usable in more types of heating devices, easier and cheaper to manufacture, install, and service, less subject to distortion induced by expansion and contraction of their components as they heat up and cool off, and are, for all practical purposes, free from flashback.

The heating units disclosed in the copending applications mentioned above can be made in any desired length. However, as they are lengthened, distortion resulting from heating and cooling induced expansion and contraction of their components increasingly becomes a problem.

Another problem with heating units of the type mentioned above is that there is no provision for controlling the distribution of the combustible fuel-air mixture lengthwise of the burner. Consequently, there is no way to vary the heat emission pattern of the unit.

The latter deficiency is of particular import in applications of which the drying of webs of paper is exemplary. In many instances, particularly where the web is wide, the center of the web tends to become overheated if heat is applied uniformly across the web as it is by the heating units disclosed in the copending applications identified above. Consequently, in certain applications, the heating units disclosed in these copending applications may be incapable of providing the pattern of heat emission and distribution required for optimum results.

Another aspect of the problem just discussed is that, in very long heating units of the type disclosed in the above-mentioned copending Fannon and Fannon et al. applications, particularly those in which the combustible mixture supply conduit is connected to one end of the burner or infrared generator, there may not be an even distribution of the combustible fuel-air mixture over the length of the unit. This may result in erratic operation or an uneven heat emission pattern, making such heating units unsatisfactory for applications where a uniform distribution heat over a long span is required.

We have now discovered that the problems of distortion and distribution of the fuel-air mixture in very long heating units of the type disclosed in the previously identified copending Fannon and Fannon et al. applications can be avoided by connecting two or three or even more shorter line burners or infrared generators in end-to-end relationship. This makes it feasible to reduce the length of the components which are subject to distortion to a point where the magnitude of the temperature change induced expansions and contractions of the components are so small that they do not cause distortion of the effected components.

Where three or more units are employed in the multiple line burner or infrared generator installation, we preferably employ a novel valving arrangement to adjust the flow of the combustible mixture to successive units and, in infrared generators where the individual units are spaced apart, a flash tube which permits the flame to pass from one unit to the next and thereby eliminates the need for more than one igniter for each installation. The flash tubes become incandescent during operation of the installations in which they are incorporated and emit infrared radiation in the gaps between the radiant members of adjacent units. Consequently, there is a continuous and substantially uniform infrared radiation emission pattern over the length of the multiple unit installation. This is an important and novel feature because it insures a uniform distribution of radiant energy on the object or into the area being heated.

The flash tubes may be of imperforate sheet metal or may be of the same apertured construction as the preferred radiant grids. Flash tubes of the latter type, especially when configured as hereinafter described, may be advantageously employed in applications where a uniform pattern of infrared radiation emission is desired as they reach nearly the same temperatures as the radiant grids and, therefore, emit infrared radiation in virtually the same pattern as the latter.

For multiple unit infrared generator installations, we have also invented reflective connectors for bridging the gaps between the reflectors of adjacent units. The use of such connectors is a significant feature of the present invention as it insures uniformity in the beam of emitted infrared radiation over the length of the installation, further insuring a uniform distribution of the emitted radiant energy. The connectors also prevent infrared radiation from escaping through the gaps between reflectors and striking objects or penetrating into areas where it is unwanted.

The fuel-air mixture flow controls, flash tubes, and reflector connectors described above can also be employed in installations of only two line burners or infrared generators, if desired. And, for certain applications, installations of three or more units may be made without part or all of these components.

From the foregoing, it will be apparent that one important object of the present invention is the provision of novel multiple unit line burner and infrared generator installations which have all of the advantages of the line burners and infrared generators disclosed in the copending Fannon and Fannon et al. applications discussed above and which are, for practical purposes, not susceptible to temperature change induced distortions even though they have a very long span.

Another important object of the present invention is the provision of novel multiple unit line burner and infrared generator installations which have the advantages of the line burners and infrared generators disclosed in the abovementioned Fannon and Fannon et al. applications and, in addition, novel means for controlling the distribution of the fuel-air mixture along the length of the units in the installation to assure optimum performance and to permit adjustments in the pattern of heat emission to be made.

Other important objects of the present invention include the provision of novel multiple unit line burner and/or infrared generator installations which:

(1) Are capable of emitting infrared radiation in a continuous and substantially uniform pattern;

(2) Have continuous reflective surfaces for forming emitted radiation into a continuous and substantially uniform beam;

(3) Can be lighted from a single end;

(4) Have a novel flow control between adjacent units for adjusting the distribution of the fuel-air mixture;

(5) Are composed of line burners or infrared generators of the type disclosed in the copending Fannon and Fannon et al. applications identified above.

Other objects, additional advantages, and further novel features of the present invention will be apparent from the appended claims and from the ensuing detailed description and discussion as it proceeds in conjunction with the accompanying drawing, in which:

FIGURE 1 is a partially sectioned side view of a multiple unit combustion type infrared generator installation constructed in accord with the principles of the present invention;

FIGURE 2 is a view, similar to FIGURE 1, of a second form of multiple unit combustion type infrared generator installation constructed in accord with the principles of the present invention;

FIGURE 3 is a fragmentary side view of the installation of FIGURE 2 and is drawn to a larger scale than the latter figure;

FIGURE 4 is a partial section through the installation of FIGURE 2, taken substantially along line 4—4 of FIGURE 3, and shows details of the connectors employed to join the reflectors of adjacent units;

FIGURE 5 is a section through a combustible mixture flow control employed between adjacent units in the installation of FIGURE 2 to regulate the distribution of the fuel-air mixture and is taken substantially along line 5—5 of FIGURE 3;

FIGURE 6 is a section through a multiple unit heating installation constructed in accord with the principles of the present invention and employing a modified form of flash tube; and FIGURE 7 is a section through the flash tube employed in the heating installation of FIGURE 6, taken substantially along line 7—7 of the latter figure.

Referring now to the drawing, FIGURE 1 depicts a multiple unit heating installation 20 constructed in accord with the principles of the present invention. Installation 20 consists of two infrared generators 22 of the combustion type connected in end-to-end relationship by bolts 24 and cage nuts 26 to a supporting frame 28 which may be of any desired configuration and fabricated of any suitable materials.

Infrared generators 22 are of the construction disclosed in copending Fannon et al. application No. 397,775 and it is therefore not deemed necessary to describe them in detail herein. Briefly, however, each of the infrared generators 22 consists of a line burner 29; one or more radiant grids 30, which convert the energy liberated by the combustion of a fuel-air mixture in the line burners into infrared radiation; and reflectors 32 which concentrate the infrared radiation emitted by radiant grids 30 and project it in the desired direction or directions.

Referring now to FIGURES 1 and 3–5, each line burner 29 includes a fuel-air mixture distribution tube 34; an orifice grid 36, through which the fuel-air mixture flows from the interior of distribution tube 34 to a combustion zone adjacent the outer end or face 38 of the grid; and end brackets 40 and 42 which form closures for the open ends of distribution tube 34 and by which infrared generators 22 are attached to supporting frame 28 (the line burners and infrared generators employed in the installations of FIGURES 1 and 2 are identical except for the construction of the end brackets as will become apparent hereinafter and, therefore, FIGURES 3–5 will be referred to in describing details of the line burners 29 and infrared generators 22 employed in the heating installation 20 of FIGURE 1 even though these figures actually illustrate the burners and infrared generators of the installation of FIGURE 2).

Distribution tube 34 of line burner 29 is formed from sheet metal (aluminized sheet steel is satisfactory) into a generally diamond-like configuration, and the opposed lateral edge portions of the sheet from which distribution tube 34 is formed are bent at angles to the two distribution tube walls with which they are integral to form two parallel, spaced apart flanges 43 providing an outlet passage between the interior and the exterior of the distribution tube. The preferred method of fabricating distribution tube 34 is described in the copending Fannon application mentioned above.

Orifice grid 36, through which the combustible fuel-air mixture flows from distribution tube 34, is mounted in the outlet passage between flanges 43 of fuel-air mixture distribution tube 34 to prevent the flame from flashing back from the combustion zone through this passage to the interior of the tube. The orifice grid 36 may be of the ribbon type (it is not critical that a ribbon type orifice be employed), which consists of embossed metallic ribbons providing a number of small passages extending between and opening onto the opposed lateral edges of the assemblage of ribbons. The particular configuration of the individual ribbon is not critical in the present invention; and the length and total area of the lateral passages may be varied as desired for particular applications of this invention. It is necessary, however, that the lateral passages be sufficiently small in cross section and sufficiently long that flame cannot flash back through the passages from the combustion zone adjacent the outer face 38 of the orifice grid to the interior of distribution tube 34. In addition, the total area of the openings must be great enough that the combustible mixture will flow from distribution tube 34 to the combustion zone in sufficient quantity to maintain the desired rate of combustion. As suitable orifice structures are disclosed in the above-mentioned copending Fannon application and as the construction of the orifice grid, by itself, is no part of the present invention, it is not believed necessary to describe it in detail herein.

Orifice grid 36 is removably retained in the outlet passage between distribution tube flanges 43 by studs 44 and straps 46 (see FIGURES 3 and 4). Studs 44, which extend laterally through distribution tube flanges 43 at spaced intervals along the tube, locate orifice grid 36 relative to the inner end of the passage between distribution tube flanges 43. Retainers 48, threaded on the ends of the studs 44, clamp flanges 43 against orifice structure 36 to removably retain it in the outlet passage.

Straps 46, which prevent orifice structure 36 from dropping out of the passage, are provided at the ends of distribution tube 34. They extend across the outlet passage between the two distribution tube flanges 43 and are fixed to the flanges as by brazing.

Referring now to FIGURES 1 and 3, the sheet metal end brackets 40 by which infrared generators 22 are fixed to supporting frame 28 have two integral legs 50 and 52 bent at right angles into an L-shaped configuration. With end brackets 40 assembled to distribution tubes 34, bracket legs 50 are juxtaposed to and form closures for the open opposite ends of distribution tubes 34; and bracket legs 52 extend in parallel, spaced relationship along the top of distribution tube 34.

Two of the cage nuts employed to mount infrared generators 22 on frame 28 (only one of which is shown) are welded in side-by-side relationship to the bottom side of each mounting leg 52; and cooperating apertures are formed in each mounting leg in alignment with the threaded central bores of the cage nuts. By this novel arrangement, infrared generators 22 may be readily and securely attached to supporting frame 28 merely by threading the bolt 24 passing through the frame into cage nuts 26. As shown in FIGURE 1, this clamps the mounting legs 52 of brackets 40 against supporting frame 28 to rigidly secure the infrared generators to the frame.

An aperture 54 is formed in the closure forming leg 50 of each bracket 40 to accommodate a combustible mixture supply conduit 56 which extends from the source of the combustion mixture (which is not shown, but may be, for example, a fuel-air mixer) into the interior of the associated fuel-air mixture distribution tube.

The end brackets 42 employed at the ends of fuel-air mixture distribution tubes 34 opposite end brackets 40 are identical to the latter except that there are no combustible mixture supply conduits at the juxtaposed ends of distribution tubes 34 and, therefore, no apertures 54 in brackets 42.

End brackets 40 and 42 are attached to fuel-air mixture distribution tubes 34 by angle clamps 58 which are best illustrated in FIGURE 3 and which are fixed, as by spot welding, to the ends of fuel-air mixture distribution tubes 34. Angle clamps 58 are described in detail in the copending Fannon et al. application mentioned above, to which reference may be had, if desired, for a more detailed description of these components.

The mounting legs 52 of end brackets 40 and 42 are fixed to angle clamps 58 by bolts 60. Nuts 62, threaded on bolts 60, clamp end brackets 40 and 42 against the angle clamps.

Referring now to FIGURES 1 and 3, to prevent the combustible mixture from leaking through the end of fuel-air mixture distribution tubes 34, circular gaskets 64 are assembled between the closure forming legs 50 of end brackets 40 and 42 and the associated ends of distribution tubes 34. When nuts 62 are tightened, gaskets 64 are compressed and form a gas tight seal between the ends of the distribution tube and the associated closure forming legs 50 of the end brackets.

Central apertures 66 are formed in the gasket 64 used with end brackets 40 to accommodate combustible mixture supply conduits 56.

Radiant grids 30, which are added to the line burners 29 just described for radiant energy applications of the present invention to emit the energy desired for space, article, or other heating in radiant energy applications of this invention, are preferably of the apertured construction disclosed in copending application No. 370,795 filed May 28, 1964, by Arthur C. W. Johnson modified in the manner disclosed in the above-identified Fannon and Fannon et al. applications. In the present invention, however, radiant grids 30 are made of a sheet of heat resistant metal such as Inconel or Hastelloy-X or a coated alloy bent into a horseshoe configuration providing a radiation emitting body 30a and in turned mounting flanges 30b extending toward each other from opposite sides of the radiation emitting body. This configuration is an important feature of the present invention as it provides a grid which is uniformly heated, which is extremely rigid and resistant to distortion, and which minimizes the dissipation of usable radiation to the fuel-air distribution tube.

The body 30a of each radiant grid 30 is formed by stamping or other process into a configuration in which loops 30c are displaced from the plane of the sheet from which the grid is formed at regular intervals to form shielded openings extending normal to the sheet through which the combustion products may pass from the combustion zone. This results in a grid which is a highly efficient emitter of infrared radiation and which effectively protects the flame from air currents of sufficient strength to quench or snuff it out.

In flanges 30b loops 30c are preferably flattened back into the plane of the flanges or are omitted to provide flat flanges which can be readily clamped between the members employed to attach grids 30 to the distribution tubes of the infrared generators in which they are incorporated.

For radiant energy applications, radiant grids 30 are removably attached to the flanges 43 of fuel-air distribution tubes 34 by cooperating pairs of inner and outer grid clips 68 and 70. A pair of clips 68 and 70 is employed on either side of each radiant grid 30 at each of the studs 44, which extend through the clips. The retainers 48 threaded on studs 44 retain the grid clips and grids 30 in place.

In the assembled infrared generators 22, the space between each pair of clips 68 and 70 is slightly greater than the thickness of the radiant grids 30. This permits longitudinal movement of the flanges of the radiant grids between the clips as the parts expand and contract due to temperature changes, but restrains the grids against appreciable transverse movement. This permits grids 30 to expand axially as their temperature increases, which prevents them from becoming distorted as they expand and contract longitudinally. Lateral expansion is accommodated by the horseshoe configuration of the radiant grids so that the grids are almost entirely free from expansion and contraction induced distortions.

In the present invention, relatively short (not longer than about 24 inches) radiant grids 30 are employed, and the several grids 30 are independently fixed to the distribution tubes 34. Both the use of short radiant grids and the independent connection of the grids to the distribution tubes are significant factors in minimizing expansion and contraction induced distortion of the radiant grids when infrared generators 22 are very long.

The reflectors 32 preferably employed in infrared generators 22 to form the infrared radiation emitted from grids 30 in a beam of the desired configuration and to project the beam in the desired direction or directions may be formed from sheets of aluminized steel or any other good reflector of infrared radiation. Retainers 72, threaded on the outer ends of studs 44, secure reflectors 32 on studs 44 against retainers 48 with the reflecting surfaces 74 of the two reflectors inclined outwardly relative to radiant grids 30. Reflectors 32 therefore concentrate the infrared radiation emitted from the grid and project it in a downwardly directed beam toward the area or onto the objects to be heated by infrared radiation. Also, as is apparent from FIGURE 4, the reflectors direct radiant energy emitted from radiant grids 30 and the combustion products exhausted through the openings formed by the displacement of loops 30c away from distribution tube 34, thereby protecting the latter against overheating.

For applications of the present invention where heating by direct flame radiation, flame impingement, or circulation of the hot combustion products is desired, installation 20 is assembled without radiant grids 30, reflectors 32, and the elements utilized to attach these elements—i.e., with line burners 29 alone as the heating units.

Multiple unit line burner and infrared generators of the type illustrated in FIGURE 1 are suitable for applications where two units which are not so long as to be subject to distortion or to cause uneven distribution of the combustible mixture will provide the necessary span. Where still longer burner or infrared generator lines are required, three or more line burners or infrared generators can be employed in an end-to-end arrangement as in the multiple unit infrared generator installation 76 illustrated in FIGURE 3.

Multiple unit infrared generator installation 76 includes three infrared generators 78, 80, and 82, which, as described previously, are substantially identical to infrared generators 22, connected by bolts 84 and cage nuts 86 to a supporting frame 87 in the same manner as in the embodiment of FIGURE 1 except that the infrared generators, instead of being disposed in abutting relationship as in the embodiment of FIGURE 1, are separated a short distance.

The two end infrared generators 78 and 82 in installation 76 are supplied with the combustible fuel-air mixture in the same manner as the infrared generators 22 of the FIGURE 1 embodiment—i.e., by fuel-air mixture supply conduits 56, which extend through end brackets 40 and gaskets 64 into the interior of fuel-air mixture distribution tube 34.

However, in this embodiment of the invention, to supply fuel to the center infrared generator 80, centrally apertured end brackets 40 and apertured end gaskets 64 are employed at both ends of infrared generators 78, 80, and 82. Extending across the gap between infrared generators 78 and 80 and through the apertures in the end brackets 40 and end gaskets 64 of these two infrared generators into the interior of their fuel-air mixture distribution tubes 34 is a fuel-air mixture supply conduit 88, which permits the fuel-air mixture to flow from the distribution tube 34 of infrared generator 78 into the distribution tube 34 of infrared generator 80. A similar conduit, identified by reference character 88', provides a flow path for the fuel-air mixture between the distribution tube 34 of infrared generator 82 and the end of the distribution tube 34 of infrared generator 80 opposite that into which flow conduit 56 extends. As shown in FIGURES 4 and 6, the conduits are free of rigid connection to at least one of the two end brackets through which they extend. This accommodates expansion and contraction of the distribution tubes during operation of the infrared generators.

To regulate the flow of the combustible mixture from infrared generators 78 and 82 into the fuel-air mixture distribution tube 34 of infrared generator 80, flow regulators 90 and 90' are provided. As is best shown in FIGURES 3 and 5, flow regulator 90 is a round damper or valve member 92 attached as by welding to a nut 94 fixed on the lower end of a threaded valve stem 96. Valve stem 96, which may be an ordinary bolt or screw, extends through the wall of conduit 88 to which it is rotatably fixed by a nut 98 mouned, as by welding, on the exterior of the conduit. By rotating valve stem 96, the position of valve member 92 in and the dimensions of the flow passage through conduit 88 can be varied to adjust the rate at which the combustible mixture flows between the distribution tubes 34 of infrared generators 78 and 80.

To retain valve stem 96 and, consequently, valve member 92, in the positions to which they are adjusted, a nut 100 is threaded on valve stem 96 before it is threaded through nut 98 and valve member 92 attached. By screwing nut 100 down against nut 98, the valve stem and valve member can be locked in the desired position.

Flow regulator 90' is identical to flow generator 90 and is located in the conduit 88' between infrared generators 80 and 82.

The use of the flow regulators 90 and 90' just described is an important feature of the present invention. Specifically, as discussed previously, this innovation makes it possible to vary the heat emission pattern of multiple unit installation 76 lengthwise of the unit. Also, flow regulators 90 and 90' make it possible to regulate the flow of the combustible mixture into the distribution tube 34 of the infrared generator 80 in a manner which will prevent erratic operation and insure a uniform heat emission pattern along the length of the installation for applications where such a pattern is desired.

Another important feature of the present invention are the flash tubes 104 and 104' between the juxtaposed radiant grids 30 of adjacent infrared generators 78 and 80 and 80 and 82. As shown in FIGURE 3, radiant grids 30 are horseshoe shaped members, and end caps 108 are fixed to the outer ends of the outermost grids of each infrared generator 78, 80, and 82 to maintain the grid bodies in the desired shape and to prevent air currents from disturbing the flame. In accord with the principles of the present invention, and as best shown in FIGURE 4, apertures 110 are provided in the juxtaposed end caps 108 of the adjacent radiant grids 30 of infrared generators 78 and 80 and in the juxtaposed end caps 108 of generators 80 and 82. Flash tubes 104 and 104', which are rolled tubes having gaps 111, extend through apertures 110 and are welded to one of the two associated end plates 108. They are left free at the other end plate through which they extend to accommodate expansion and contraction of the radiant grids 30 which they bridge.

Flash tubes 104 and 104' permit flames to travel from the combustion zone adjacent the outer faces 38 of the two orifice grids 36 of the outer infrared generators 78 and 82 to the combustion zone adjacent the outer face 38 of the orifice grid 36 in infrared generator 80. Therefore, even the longest installations of the type illustrated in FIGURE 2 can be ignited from one end.

In addition, flash tubes 104 and 104', which are preferably fabricated from heat resistant material, become incandescent during operation of the three infrared generators in installation 76 and emit substantial quantities of infrared radiation. Consequently, in installations of the type illustrated in FIGURE 2, there is a continuous and substantially uniform pattern of radiant energy emission over the entire length of the installation.

The effectiveness of the operation of flash tubes 104 and 104' is materially enhanced by the gaps 111 extending longitudinally along their top edges and by the beveled or "cut back" configuration of tube ends 112. Gaps 111 permit the combustible mixture to flow directly through orifice grids 36 and into the interiors of the flash tubes as shown by arrows 113 in FIGURE 3. The longer lower portions of the tube ends 112 intercept the stream of combustible mixture issuing from the aperture in the orifice grid and direct it to the combustion zone interiorly of flash tubes 104 and 104'. The net effect of the features just discussed is a significant increase in the amount of combustible mixture directed into and burned in the flash tubes over what could be obtained with a tube having an uninterrupted periphery and square ends. Therefore, these features are of material importance in ensuring that flash tubes 104 and 104' reach a maximum temperature with a consequent minimization of the temperature differential between the flash tubes and the radiant grids and maximization of the uniformity of infrared radiation emission from these components.

Another important feature of the present invention is the use of connectors 114 to span the gap between the reflectors 32 of infrared generators 78 and 80 and 80 and 82, respectively. As shown in FIGURE 4, connectors 114 have a U-shaped configuration providing a slot 115 into which the end portions of adjacent reflector members 116 extend and which align the adjacent reflector members. Each of the connectors 114 is attached as by a metal screw 118 to one of the two reflector members 116 with which it is associated. The connector is not attached to the other of the two reflector members 116 in order to accommodate expansion and contraction induced relative movement of the two associated reflector members.

The use of the novel connectors 114, which are preferably formed of the same type of reflector material as reflectors 32, establishes continuity of reflective surfaces 74 and insures that the beam of radiation into which the infrared radiation emitted from radiant grid 30 is formed is substantially uniform over the entire length of installation 76. Connectors 114 also prevent emitted infrared radiation from passing through the gap between adjacent reflector members 116 and penetrating into areas or impinging on objects where it is unwanted.

As shown in FIGURE 2, multiple unit infrared generator installation 76 may be provided with a spark plug type igniter 120 having its spark gap (not shown) projecting into the outermost radiant grid 30 of infrared generator 82. A flame sensor 122 is similarly mounted with its sensing element projecting into the radiant grid 30 at the outermost end of infrared generator 78. Igniter 120 and flame sensor 122 are connected into an appropriate control circuit to control the operation of infrared generators 78, 80, and 82. Suitable control circuits are disclosed in copending applications Nos. 163,112 filed Dec. 29, 1961, by Rufus Wilkerson for Oven Control (now Patent No. 3,162,430) and 387,907 filed Aug. 6, 1964, by D. L. Raymond et al. for Apparatus for Preventing the Accumulation of Frost or Dew on Exposed Surfaces. Other suitable types of control circuits, which are well known in the art, may be employed.

As in the case of the embodiment of FIGURE 1, multiple unit installations of the type illustrated in FIGURE 2 may employ line burners rather than infrared generators for applications where direct flame radiation or impingement or convection heating by circulating combustion gases is desired. In this case, as radiant grid 30 and reflectors 32 are not employed, it is not necessary to use flash tubes 104 or connectors 114.

The multiple unit heating installation 124 of FIGURE 6 differs from those previously described only in the construction of the flash tube 126 employed in this embodiment of the present invention to provide a continuous radiant energy emitting surface the length of the installation and to permit flame to travel from one infrared generator 128 to the next so that the heating unit installation 124 can be lit from one end.

Flash tube 126 differs from those previously described in that it is rolled from the same type of apertured metal as radiant grids 30. Flash tube 126 is mounted in the same manner as flash tubes 104 and 104' and, like the latter, has beveled ends 130 and a longitudinally extending gap 132 (see FIGURE 7) to direct the combustible mixture into the interior of the flash tube.

The combustible mixture burns in flash tube 126, and the hot combustion escape through shielded openings 134 extending normal to the body of the flash tube and formed by displacing loops 136 from the plane of the sheet from which the grid is formed at regular intervals, as shown by arrows 138 in FIGURE 6. As the hot gases wipe across loops 136, they heat them to incandescence, causing them to emit copious quantities of infrared radiation as explained in more detail above in conjunction with radiant grids 30 and in the copending Johnson application identified above.

The combustion process in flash tube 126 is substantially the same as in the interior of radiant grids 30, and the flash tube and radiant grids have substantially the same configuration. Therefore, the flash tube and radiant grids reach virtually the same temperature, so that they emit radiation in the same range of wave lengths and with substantially the same intensity and in the same pattern. Consequently, the pattern of emitted radiation provided by multiple unit heating units provided with flash tubes of the type just described is extremely uniform.

It will be obvious, from the foregoing, that multiple unit installations of the type illustrated in FIGURES 2 and 6 just described may employ more than three line burners or infrared generators and that two or more lines of burners or infrared generator may be mounted in side-by-side relationship for applications where such arrangements can be beneficially employed. In short the novel multiple unit installations disclosed in this application have extreme flexibility, permitting them to be easily incorporated in furnaces, ovens, and other types of object and area heating apparatus. Also, it will be apparent to those skilled in the art to which this invention pertains that it is not necessary to supply the combustible fuel-air mixture to both ends of the installation, as illustrated in FIGURE 2, although this method is preferred for uniformity and distribution of the mixture, but that all of the mixture may be supplied to one end of the installation, if desired.

It will also be apparent to those skilled in the arts to which this invention pertains that many modifications in the line burners or infrared generators themselves, including those disclosed in the copending Fannon and Fannon et al. applications mentioned above, may be made. Such modifications are fully intended to be encompassed in the appended claims except as specifically excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A multiple unit radiant heating installation, comprising:
   (a) at least two infrared generators of the combustion type, each said infrared generator including an elongated fuel-air mixture distribution tube, radiant grid means substantially coextensive in length with said distribution tube, said tube and said grid means being configured to provide a combustion zone therebetween which is substantially coextensive in length with said distribution tube and said grid means, and orifice means extending substantially the length of the combustion zone and providing communication between the interior of the distribution tube and the combustion zone the length of said zone;
   (b) means for independently attaching said infrared generators in aligned, end-to-end, spaced apart relationship to supporting structure therefor with a sufficiently large gap between said infrared generator that the adjacent ends of their distribution tubes and their radiant grid means remain separated despite the longitudinal expansion thereof as their temperature increases during operation of said infrared generators;
   (c) means for supplying a combustible mixture to the distribution tube of one of said infrared generators;
   (d) means located in the gap between the distribution tubes of said infrared generators for providing fluid communication therebetween, said last-named means comprising a conduit spanning said gap and extending through the ends of said distribution tubes into the interiors thereof, at least one end of said conduit being free of rigid connection to the distribution tube into which it extends to accommodate relative movement of said distribution tubes as they expand and contract during the cycling of said infrared generators; and
   (e) a flash tube of heat resistant emissive material in and spanning the gap between the radiant grid means of said infrared generators, the ends of said tube extending through the ends of said grid means into the interiors thereof to provide for the passage of flame from the combustion zone within the grid means of one infrared generator to the combustion zone within the grid means of the other generator to provide for the passage of flame from one to the other of said combustion zones and to furnish continuity in the elongated radiant surface provided by said infrared generators, said flash tube being free of rigid connection to the grid means of at least one of said infrared generators to accommodate relative movement of said grid means as they expand and contract during the cycling of said infrared generators.

2. The multiple unit radiant heating installation of claim 1, together with reflector means adjacent the radiant grid means of said infrared generators on both sides thereof for concentrating the infrared radiation emitted by said grids and directing it in the desired direction, said reflector means being fixed to the distribution tubes of said infrared generators and extending therefrom between said tubes and said grid means and spanning the gap between said infrared generators, whereby they isolate said distribution tubes from the radiant energy emitted from said grid means and the combustion products exhausted through said grids from the combustion zones therewithin.

3. The multiple unit radiant heating installation of claim 1, wherein:
   (a) said radiant grid means each include at least one elongated radiant grid which has loops displaced from the body thereof and providing shielded openings through the grid means generally normal to said body; and
   (b) said flash tube has loops displaced from the body of the tube and providing shielded openings through said tube generally normal to the body thereof.

4. A multiple heating unit installation according to claim 1, wherein each of said radiant grid means includes a plurality of radiant grids arranged in end-to-end relationship and adapted to convert energy released by the combustion of gases issuing from said distribution tube and burning in a combustion zone adjacent said tube into infrared radiation, said radiant grids being independently fixed to said combustible mixture distribution tubes.

5. The multiple unit radiant heating installation of claim 1, wherein said flash tube has an opening extending substantially the length thereof facing the orifice means, whereby the combustible mixture will flow into said flash tube for combustion therein.

6. The multiple unit radiant heating installation of claim 1, wherein said flash tube has exhaust apertures therein and distributed in a generally uniform pattern substantially the length of said tube through which combustion products can escape from the interior of the tube.

7. The multiple unit radiant heating installation of claim 1, wherein the ends of said flash tube are beveled with the long edges of said ends being furtherest from and the short edges of said ends nearest said orifice means, whereby the beveled ends of said flash tube intercept the combustible mixture flowing through said orifice means and direct it toward a combustion zone interiorly of said flash tube.

8. An installation according to claim 1 wherein said conduit means between said distribution tubes includes a means for selectively adjusting the rate at which the combustible mixture flows from the distribution tube of said one heating unit through said conduit means into the distribution tube of the other heating unit.

9. The multiple unit heating installation of claim 8, wherein said valve means comprises:
   (a) a valve member rotatably supported in said conduit means;
   (b) a valve stem fixed to said valve member and extending through said conduit means to the exterior thereof for rotating said valve member in said conduit means; and
   (c) means accessible from the exterior of said conduit means for locking said valve member in the position to which it is adjusted by rotation of said valve stem.

10. A multiple unit heating installation, comprising:
   (a) at least two infrared generators of the combustion type, each said infrared generator including grid means comprising at least one elongated radiant grid with a cross sectional configuration providing a space for combustion in and extending substantially the length of said grid means, means substantially coextensive in length with said grid means for supplying a combustible fuel-air mixture to and distributing said mixture the length of said combustion space, and reflectors generally coextensive in length with said grid means for concentrating the radiant energy emitted therefrom and projecting it in the desired direction;
   (b) means for independently attaching said infrared generators in axially aligned, end-to-end, spaced apart relationship to supporting structure therefor with a sufficiently large gap between said infrared generators that the adjacent ends of their radiant grid means and their reflectors remain separated despite the longitudinal expansion thereof as their temperature increases during operation of said infrared generators; and
   (c) connectors of substantially the same cross sectional configuration as said reflectors and having reflective surfaces bridging the gaps between the reflectors of said infrared generators to provide continuous reflective surfaces over the length of the installation, each said connector spanning the gap between a reflector of one infrared generator and the reflector of the adjacent reflector aligned therewith, said connector being fixed to one of the reflectors bridged thereby and being free of rigid connection to the other of the reflectors bridged thereby to accommodate expansion and contraction of said reflectors during operation of the infrared generators.

References Cited
UNITED STATES PATENTS

| | | | |
|---|---|---|---|
| 579,318 | 3/1897 | Dame | 158—105 |
| 669,448 | 3/1901 | Skoog | 158—116 |
| 1,810,852 | 6/1931 | Possons | 126—92 |
| 1,900,217 | 3/1933 | Adams | 158—116 X |
| 2,011,090 | 8/1935 | Steffen | 158—115 |
| 2,203,087 | 6/1940 | Hanson. | |
| 2,647,569 | 8/1953 | Flynn | 158—116 |
| 2,980,104 | 4/1961 | Patrick et al. | 126—271.2 |
| 3,044,754 | 7/1962 | Skerkoske et al. | |
| 3,199,570 | 8/1965 | Williams et al. | 158—104 |

FOREIGN PATENTS

| | | |
|---|---|---|
| 476,648 | 5/1929 | Germany. |

FREDERICK L. MATTESON, Jr., *Primary Examiner.*